(12) United States Patent
Malone

(10) Patent No.: US 6,480,350 B1
(45) Date of Patent: Nov. 12, 2002

(54) HARD DISK DRIVE SELECTOR

(76) Inventor: Michael J. Malone, 1907 Juniper La., Bensalem, PA (US) 19020

( * ) Notice: Subject to any disclaimer, the term of this patent is extended or adjusted under 35 U.S.C. 154(b) by 10 days.

(21) Appl. No.: 09/665,993

(22) Filed: Sep. 20, 2000

Related U.S. Application Data

(60) Provisional application No. 60/155,548, filed on Sep. 24, 1999.

(51) Int. Cl.[7] .................................................. G11B 5/02
(52) U.S. Cl. ......................................... 360/69; 360/137
(58) Field of Search ............................. 360/61, 63, 64, 360/69, 137; 711/112

(56) References Cited

U.S. PATENT DOCUMENTS 6,009,518 A * 12/1999 Shiakallis ...................... 713/1
6,272,533 B1 * 8/2001 Browne ....................... 709/213

* cited by examiner

*Primary Examiner*—David Hudspeth
*Assistant Examiner*—Varsha A. Kapadia

(57) ABSTRACT

For any specific, hard disk drive that occupies a specific logical position within a computer system, A Hard Disk Drive Selector is disclosed that permits the replacement of one physically distinct, permanently mounted hard disk drive for another physically distinct, permanently mounted hard disk drive within the specific logical position occupied. The Selector simultaneously controls the addressing traces, the control/command traces and the power supply connections to all hard disk drives connected to it. The selector operates by closing the address, command/control, and power circuits to the chosen hard disk drive while opening these circuits to all other hard disk drives connected to the selector. The choice of hard disk drive is made prior to "booting" the computer system and the choice is maintained until the computer system is turn off.

1 Claim, 18 Drawing Sheets

NEW ART; THIS INVENTION

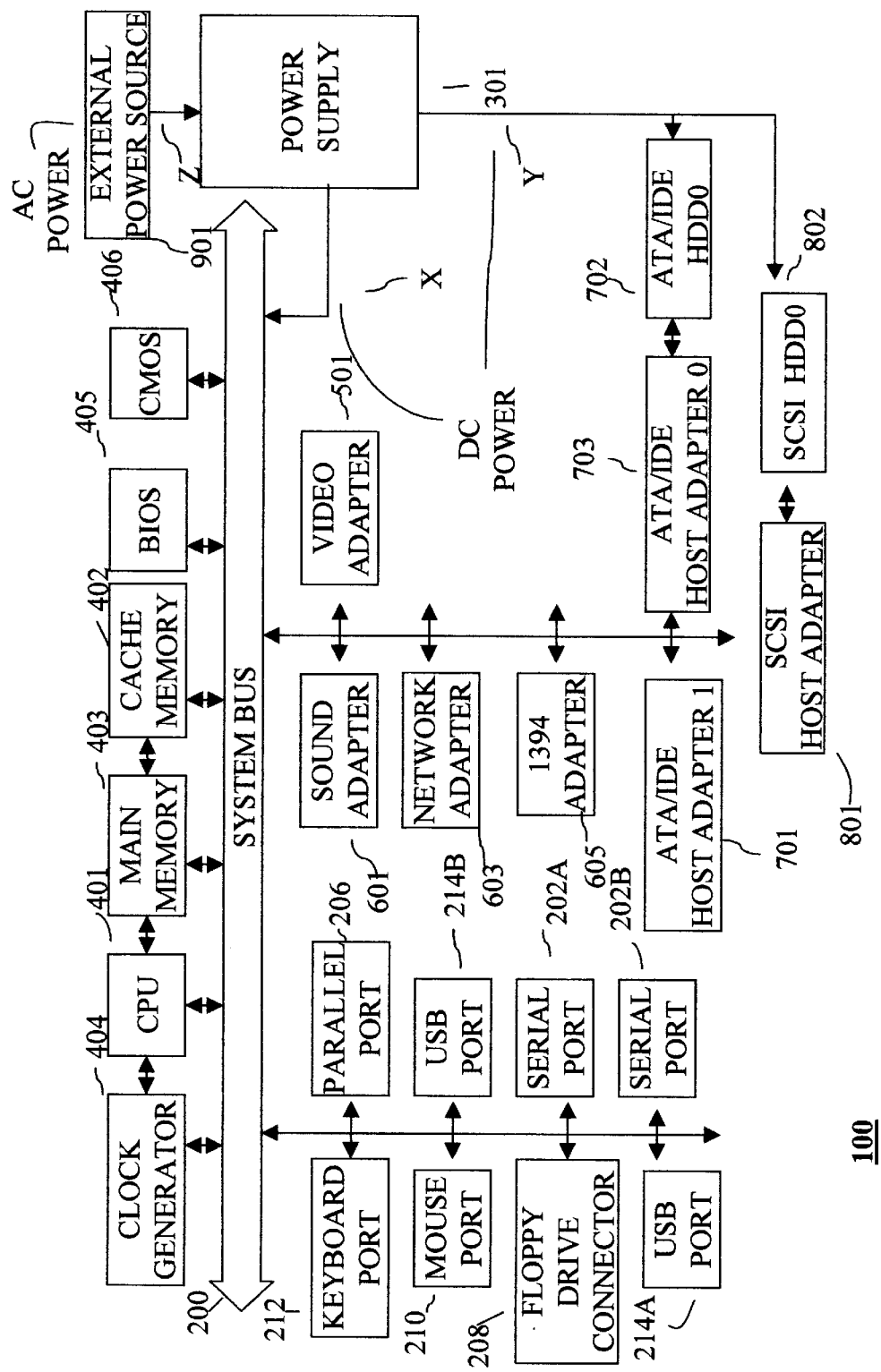
FIGURE 1: TYPICAL COMPUTER BUS

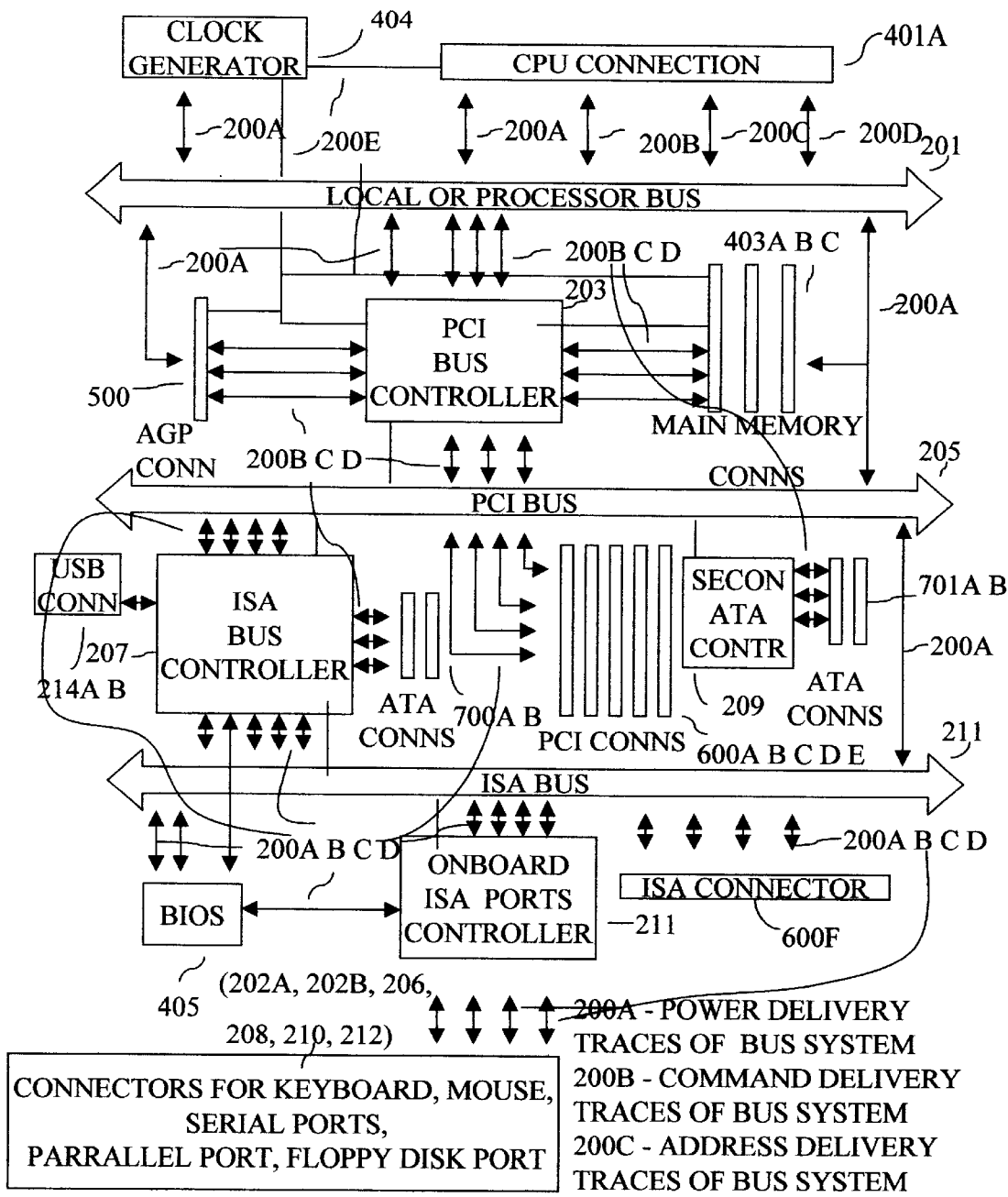
FIGURE 2: DETAILED COMPUTER BUS SYSTEM

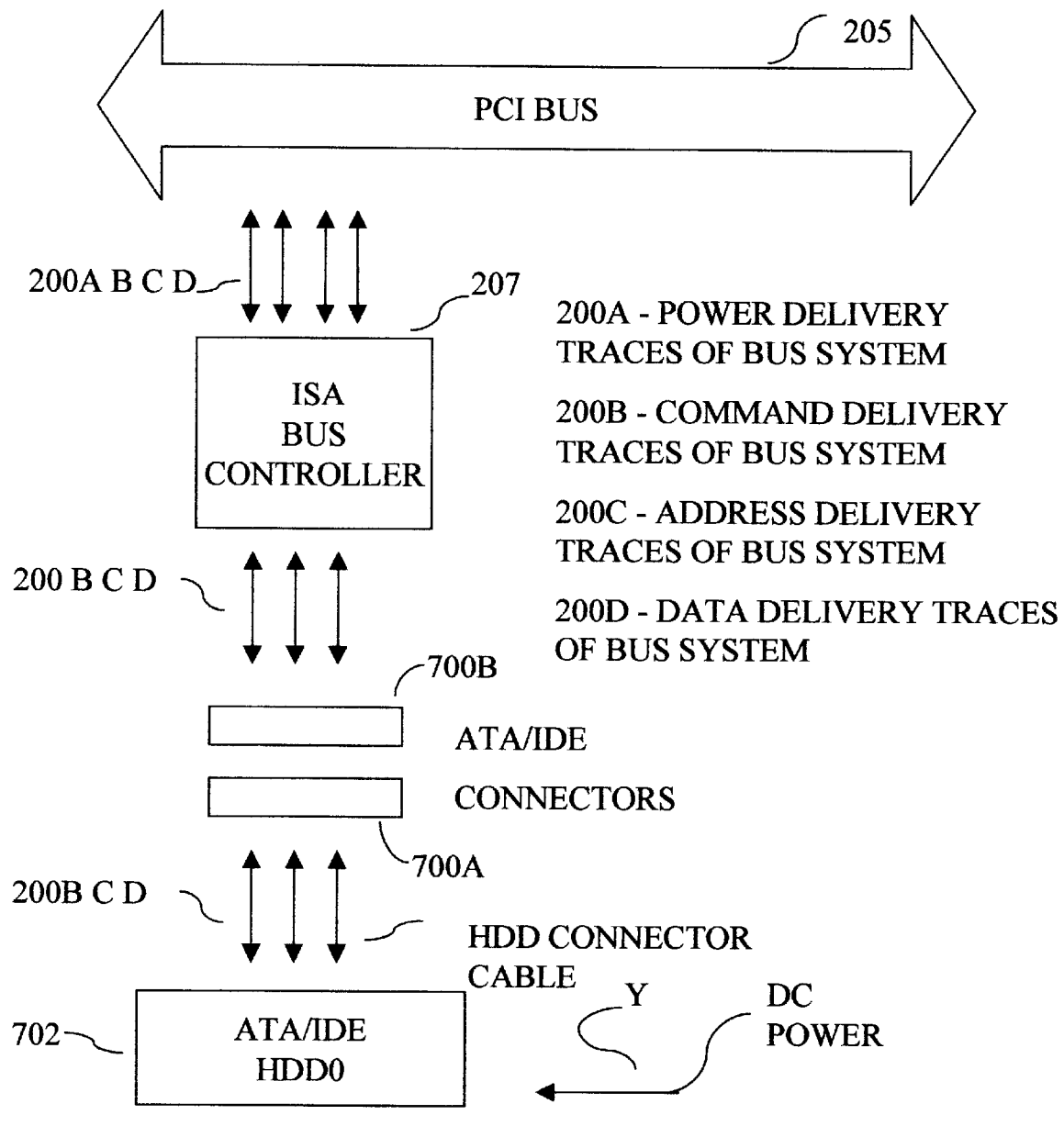
FIGURE 3: PRIOR ART; TYPICAL ATA/IDE HDD BUS SCHEME FOR ONBOARD ATA/IDE CONTROLLER

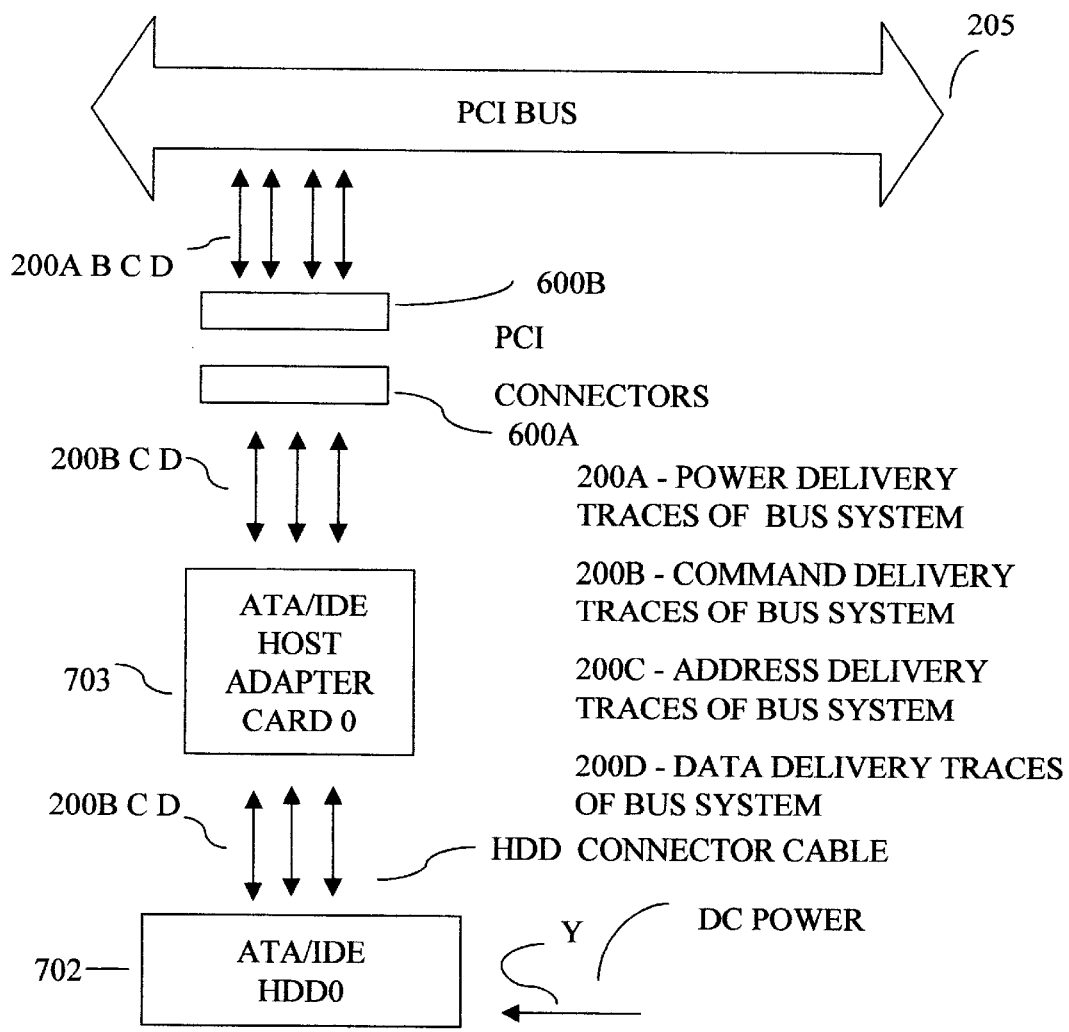
FIGURE 4: PRIOR ART; TYPICAL ATA/IDE HDD BUS SCHEME FOR ADD-IN ATA/IDE CONTROLLER

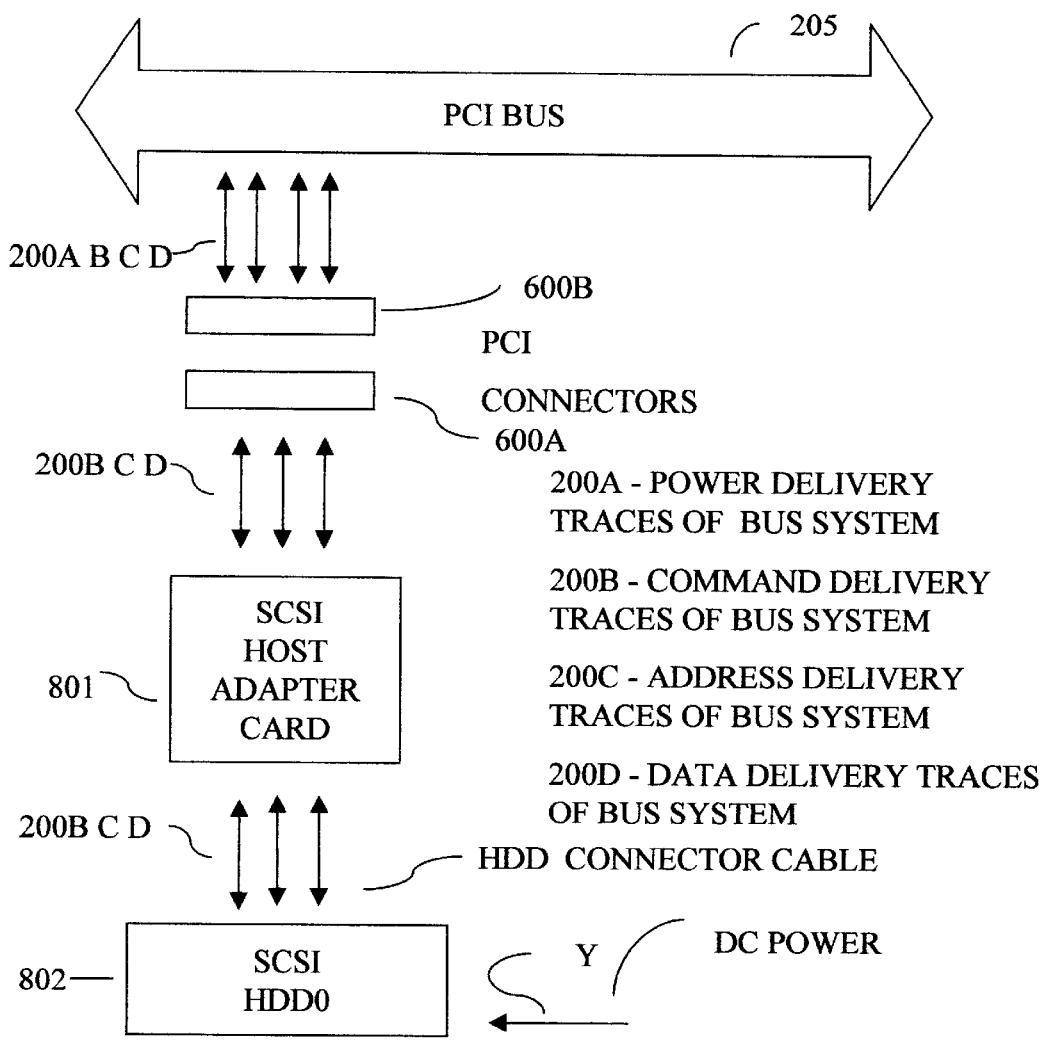
FIGURE 5: PRIOR ART; TYPICAL SCSI HDD BUS SCHEME FOR ADD-IN SCSI CONTROLLER

| PIN | PIN DESCRIPTION |
|---|---|
| 1 | RESET INITIALIZES DRIVE |
| 20 | PIN MISSING |
| 21 | DMRQ3 DMA READY TO SEND SIGNAL |
| 23 | IOW VALID DATA COMING TO DISK |
| 25 | IOR VALID DATA COMING TO DISK |
| 27 | I/O CH READY DRIVE READY SIGNAL |
| 28 | CSEL:SPSYNC CABLE SELECT MASTER/SLAVE |
| 29 | DACK3 DMA READY TO SEND SIGNAL |
| 31 | IRQ14 DRIVE INTERUPT REQUEST SIGNAL |
| 32 | IOCS16 8 OR 16 BIT TRANSFER INFO |
| 33 | AB1 DETERMINES ACCESSIBLE REGISTER |
| 34 | PDIAG SLAVE DRIVE PASSED SIGNAL |
| 35 | AB0 DETERMINES ACCESSIBLE REGISTER |
| 36 | AB2 DETERMINES ACCESSIBLE REGISTER |
| 37 | IDE_CS0 SELECTS CONTROL BLOCK REGISTERS |
| 38 | IDE_CS1 SELECTS CONTROL BLOCK REGISTER |
| 39 | DA/SP DRIVE ACTIVE/SLAVE PRESENT SIGNAL |

PINS 2, 19, 22, 26, 30, AND 40 ARE GROUNDS.

PINS 3 THROUGH AND INCLUDING 18 ARE DATA BIT TRANSFER CONNECTIONS

FIGURE 6: TYPICAL ATA/IDE BUS TRACE ASSIGNMENTS

| PIN | PIN DESCRIPTION |
|-----|-----------------|
| 25 | TERMPWR TERMINATOR POWER LINE |
| 26 | TERMPWR TERMINATOR POWER LINE |
| 29 | (POS)ATN SIGNAL TO RECEIVE DATA |
| 30 | (NEG)ATN SIGNAL TO RECEIVE DATA |
| 33 | (POS)BSY NOTIFIES BUS HDD BUSY/NOTIFIES HDD BUS BUSY |
| 34 | (NEG)BSY NOTIFIES BUS HDD BUSY/NOTIFIES HDD BUS BUSY |
| 35 | (POS)ACK NOTIFIES HDD IT CAN USE BUS |
| 36 | (NEG)ACK NOTIFIES HDD IT CAN USE BUS |
| 37 | (POS)RESET RESETS DEVICES ON SCSI BUS |
| 38 | (NEG)RESET RESETS DEVICES ON SCSI BUS |
| 39 | (POS)MSG HDD STATUS AT HANDSHAKE |
| 40 | (NEG)MSG HDD STATUS AT HANDSHAKE |
| 41 | (POS)SEL ALLOWS HDD TO SELECT TARGET DEVICE |
| 42 | (NEG)SEL ALLOWS HDD TO SELECT TARGET DEVICE |
| 43 | (POS)C/D ALLOWS HDD TO RETURN COMMAND/DATA TO BUS |
| 44 | (NEG)C/D ALLOWS HDD TO RETURN COMMAND/DATA TO BUS |
| 45 | (POS)REQ ALLOWS HDD TO OBTAIN DATA FROM BUS |
| 46 | (NEG)REQ ALLOWS HDD TO OBTAIN DATA FROM BUS |
| 47 | (POS)I/O ALLOWS HDD TO SEND OR RECEIVE DATA ON BUS |
| 48 | (NEG)I/O ALLOWS HDD TO SEND OR RECEIVE DATA ON BUS |

PINS 1, 2, 21, 22, 31, 32, 49, AND 50 ARE GROUNDS
PINS 23, 24, 27, AND 28 ARE RESERVED
PINS 3 THROUGH AND INCLUDING 20 ARE DATA BIT TRANSFER CONNECTIONS

FIGURE 7: TYPICAL INTERNAL 50 PIN SCSI BUS TRACE ASSIGNMENT

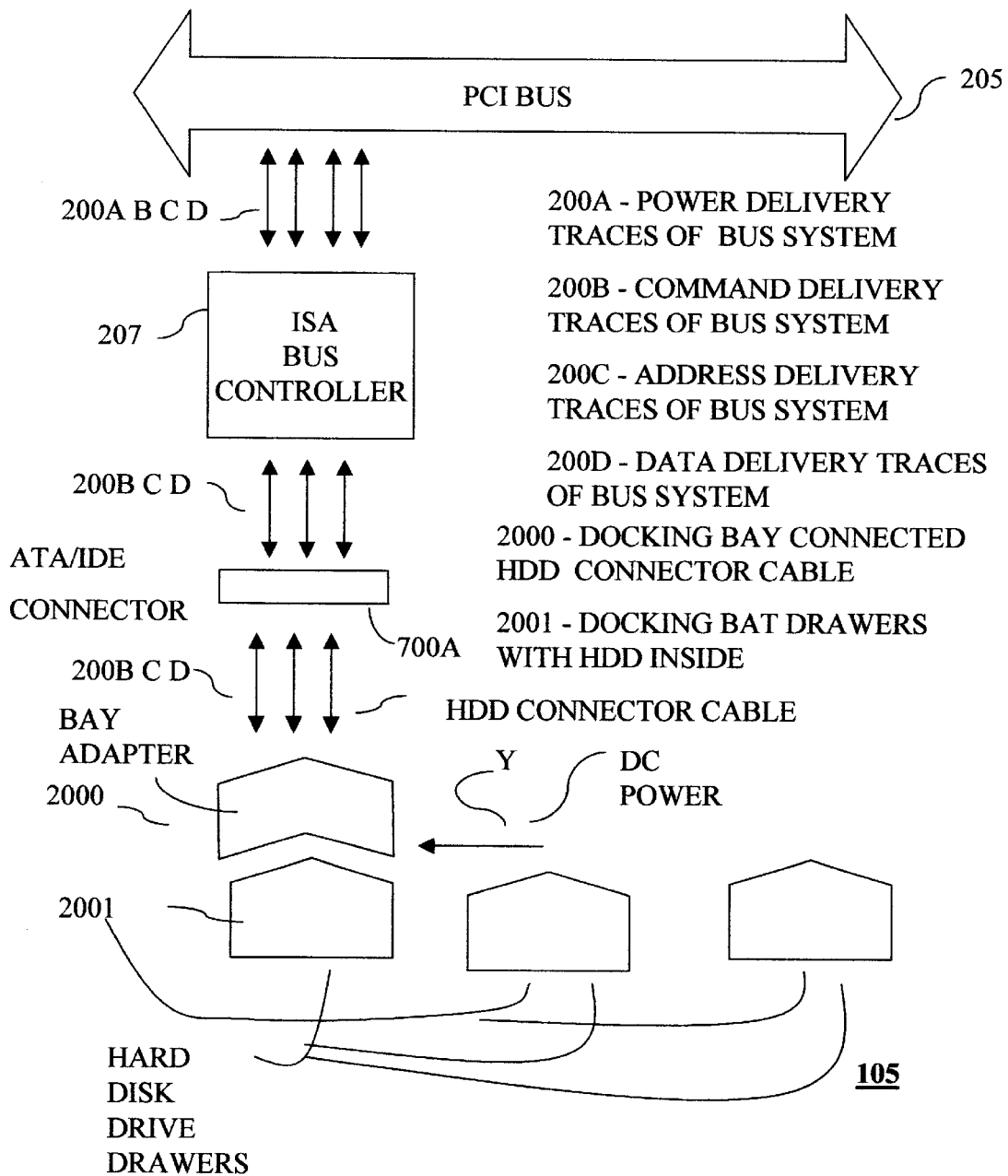
FIGURE 8: PRESENT ART; INTERCHANGABLE ATA/IDE HDD SCHEME FOR ONBOARD ATA/IDE CONTROLLER

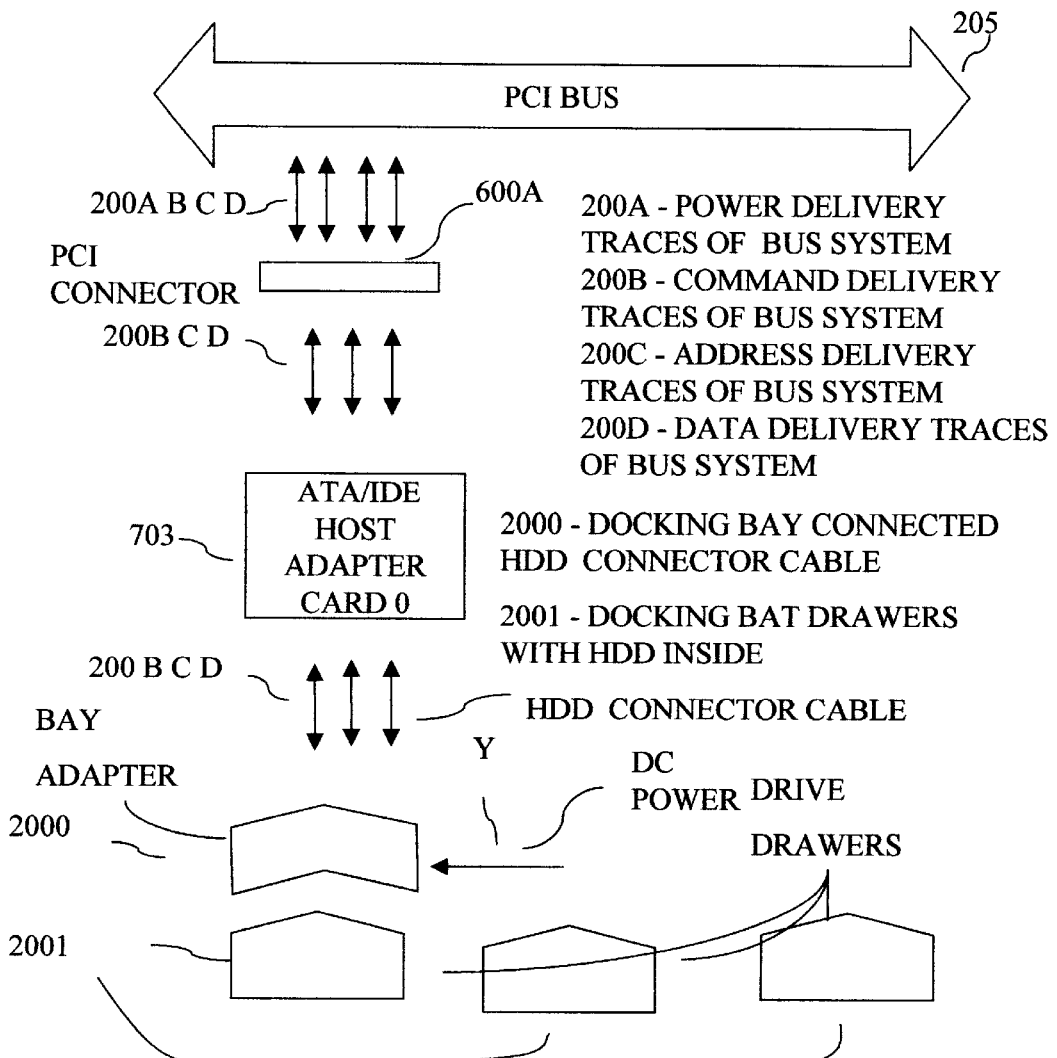
FIGURE 9: PRESENT ART: INTERCHANGABLE ATA/IDE HDD SCHEME FOR ADD-IN ATA/IDE CONTROLLER

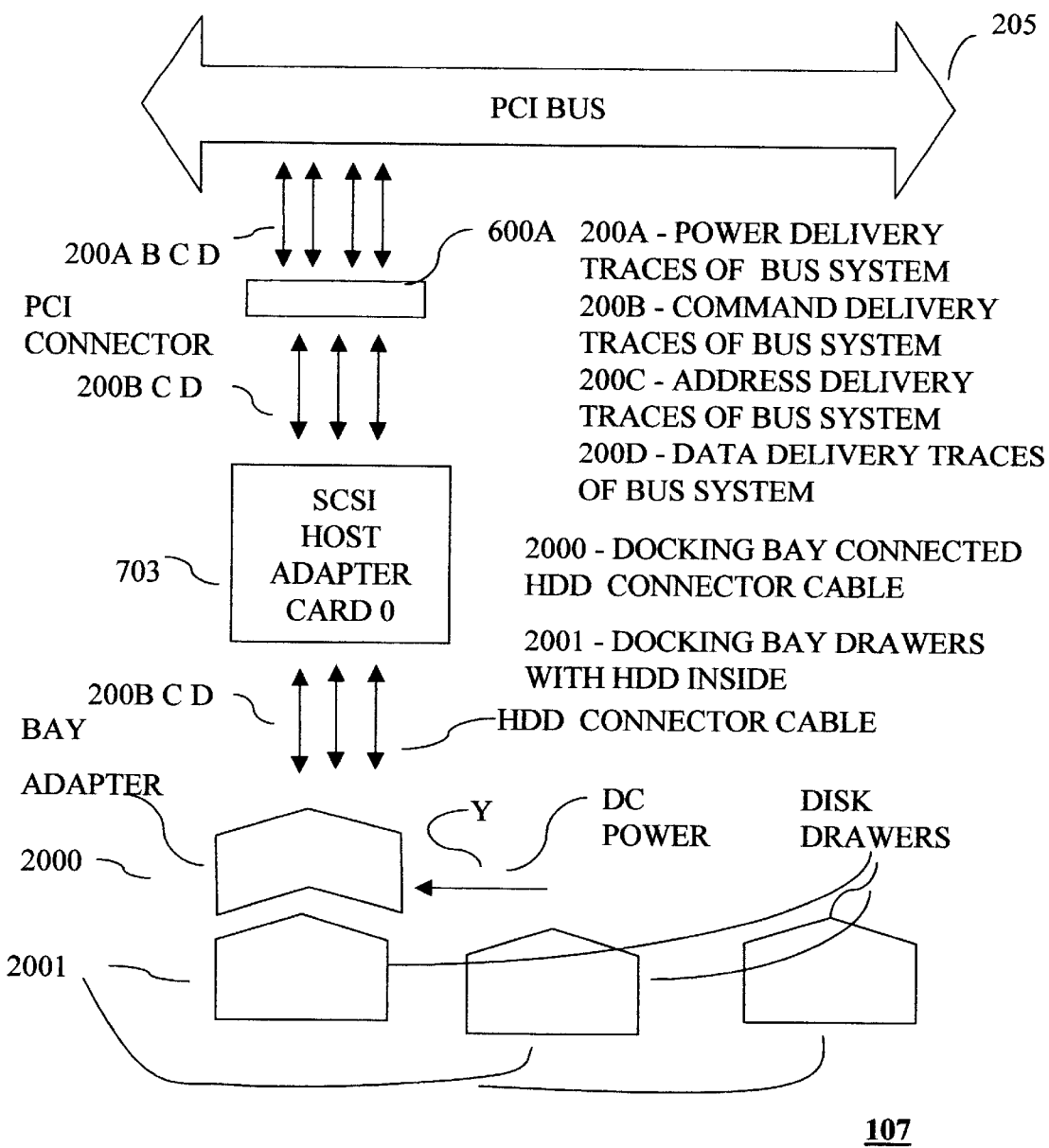
FIGURE 10: PRESENT ART: INTERCHANGABLE SCSI SCHEME FOR ADD-IN SCSI CONTROLLER

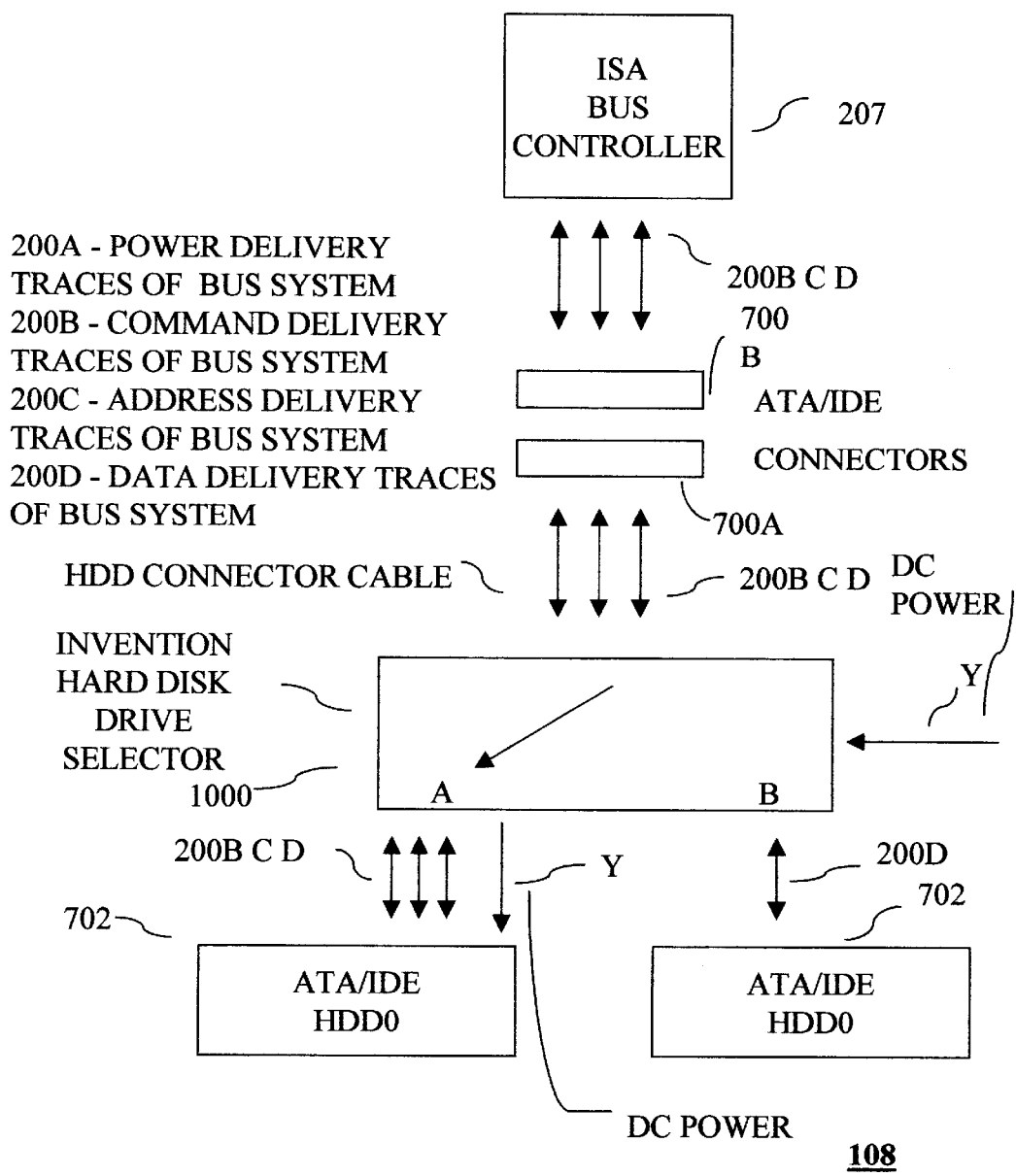
FIGURE 11: NEW ART; ATA/IDE HDD BUS SCHEME WITH INVENTION PLACED IN AN ONBOARD ATA/IDE BUS ARCHITECTURE

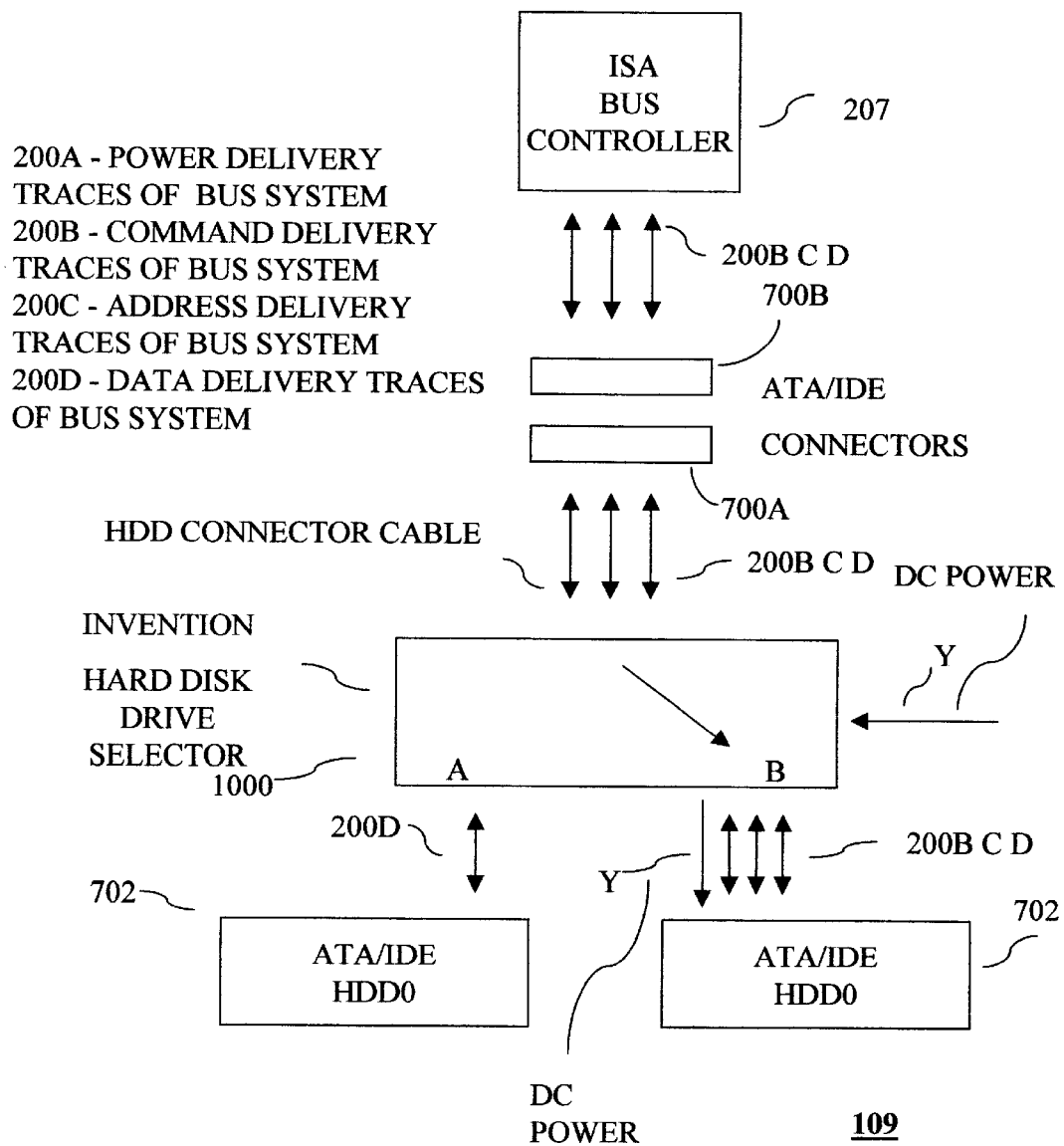
FIGURE 12: NEW ART; ATA/IDE HDD BUS SCHEME WITH INVENTION PLACED IN AN ONBOARD ATA/IDE BUS ARCHITECTURE

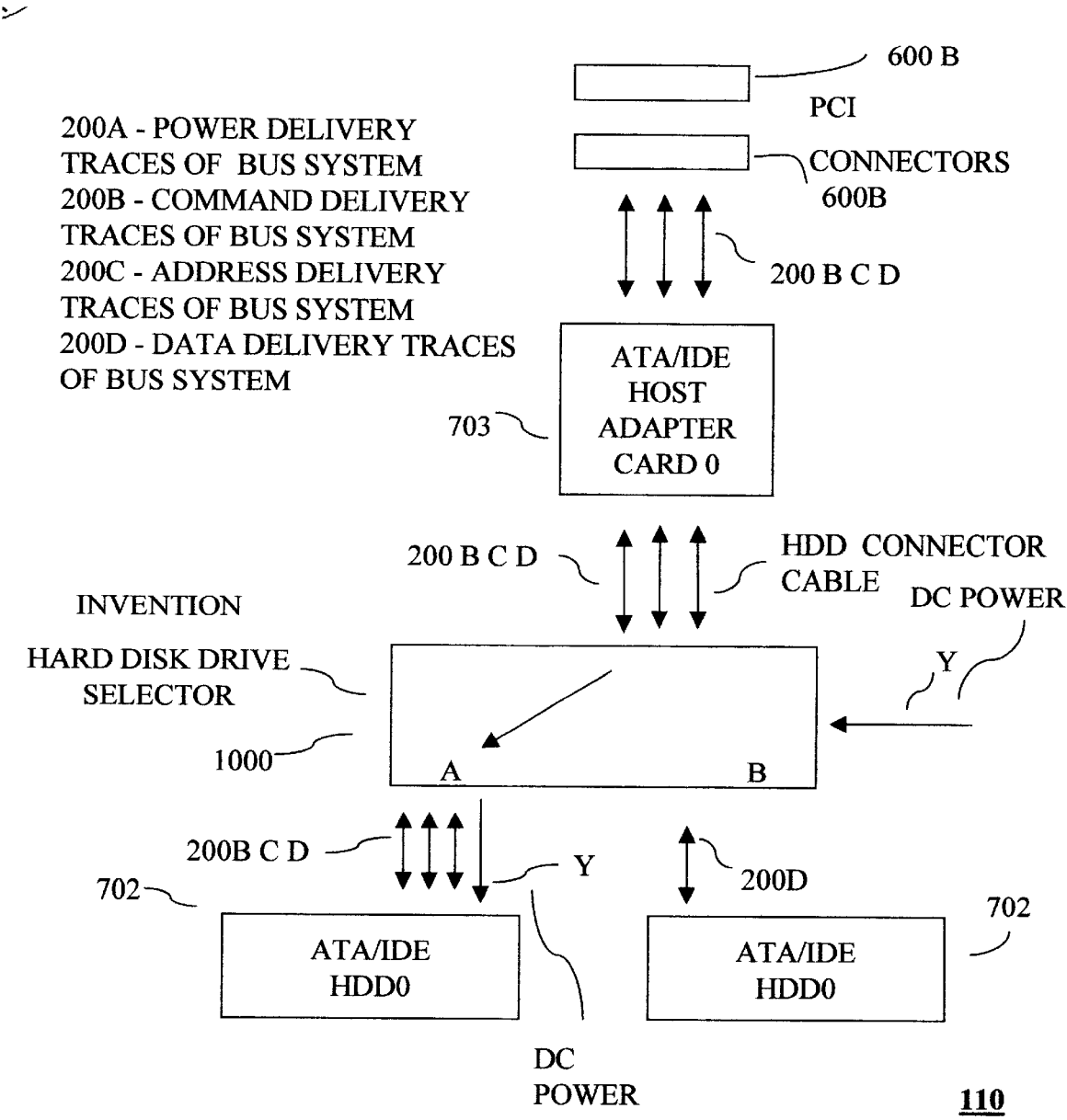
FIGURE 13: NEW ART; ATA/IDE HDD BUS SCHEME WITH INVENTION PLACED IN AN ADD-IN ATA/IDE CONTROLLER ARCHITECTURE

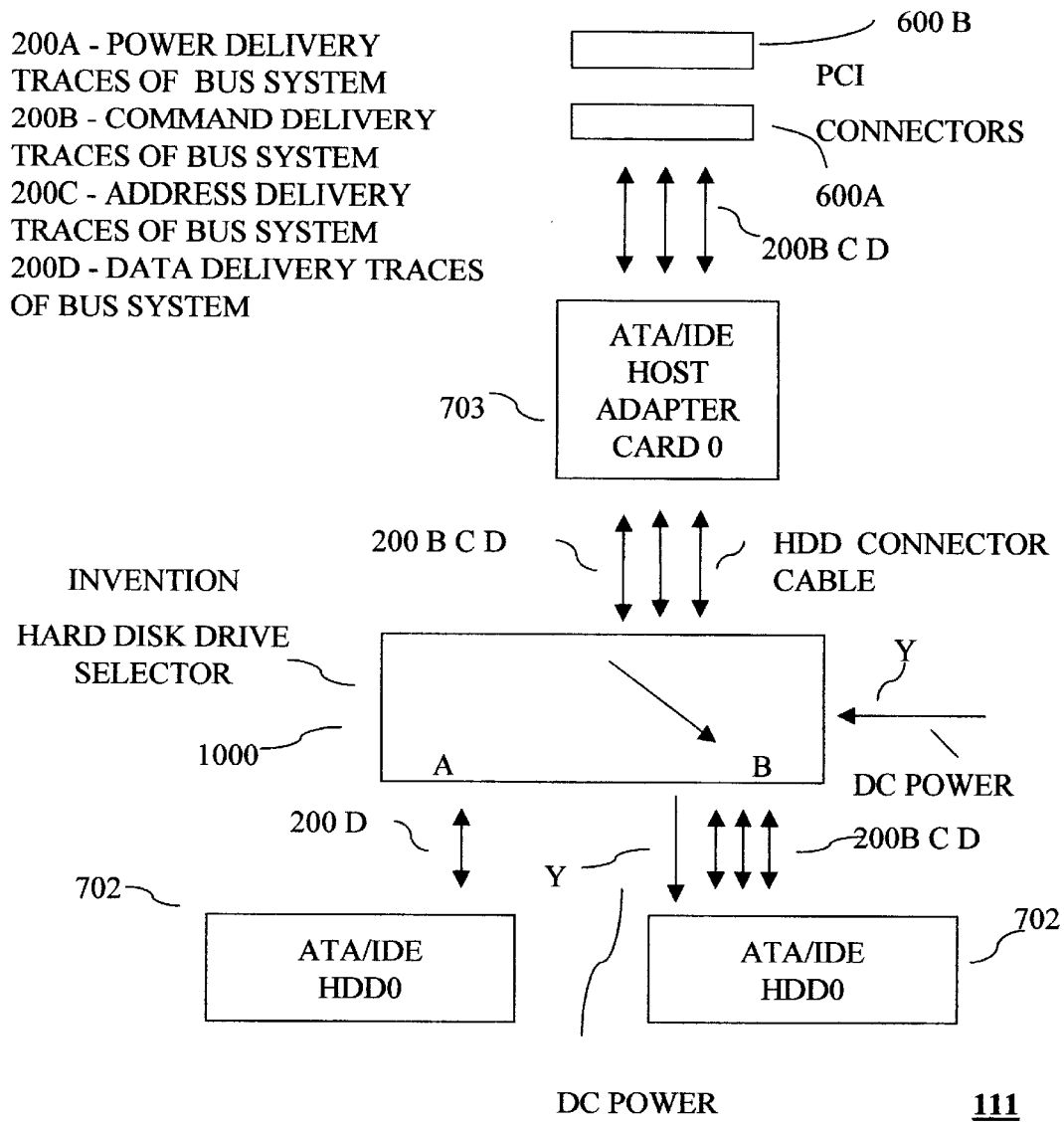
FIGURE 14: NEW ART; ATA/IDE HDD BUS SCHEME WITH INVENTION PLACED IN AN ADD-IN ATA/IDE CONTROLLER ARCHITECTURE

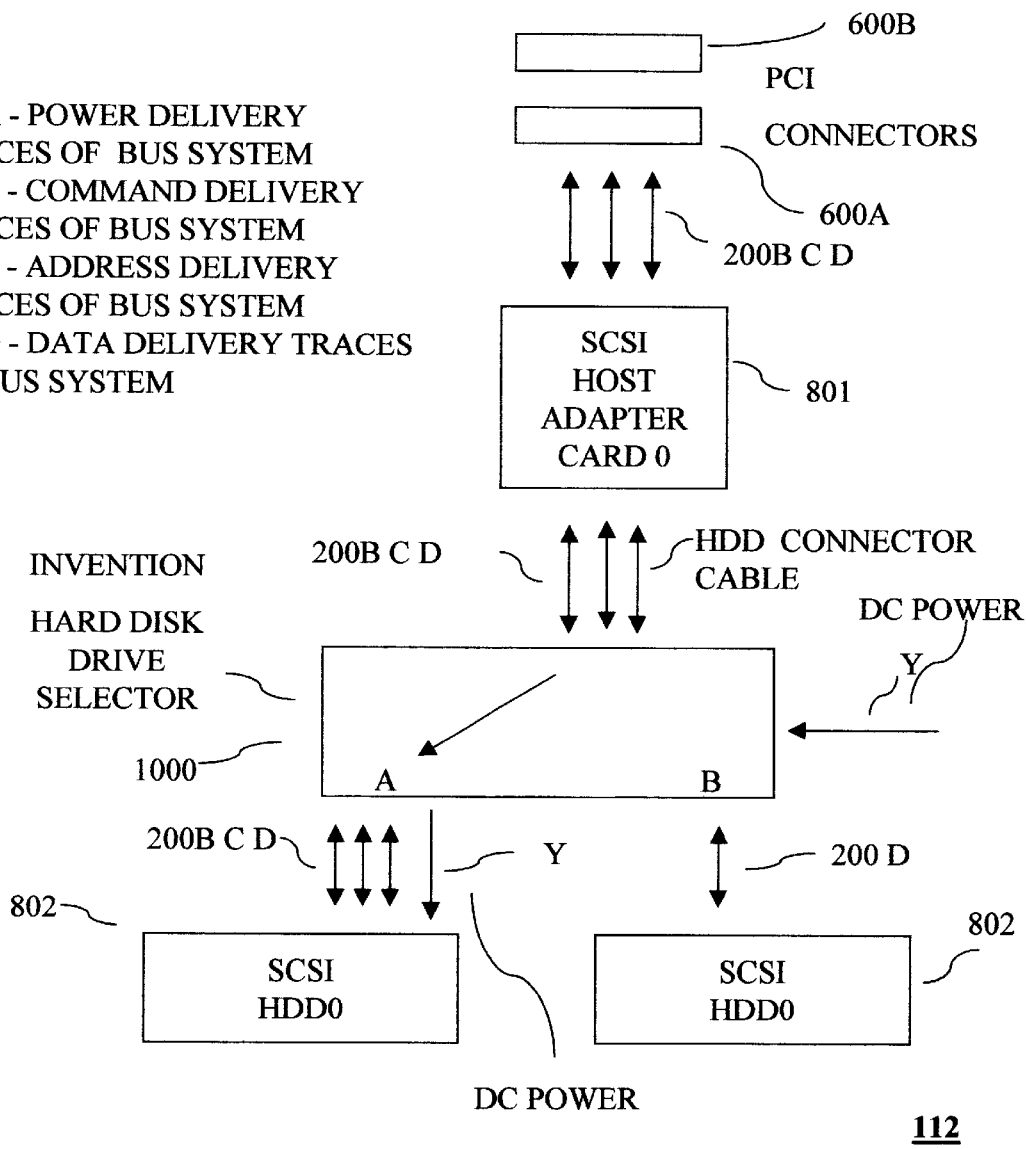
FIGURE 15: NEW ART; SCSI HDD BUS SCHEME WITH INVENTION PLACED IN AN ADD-IN SCSI CONTROLLER ARCHITECTURE

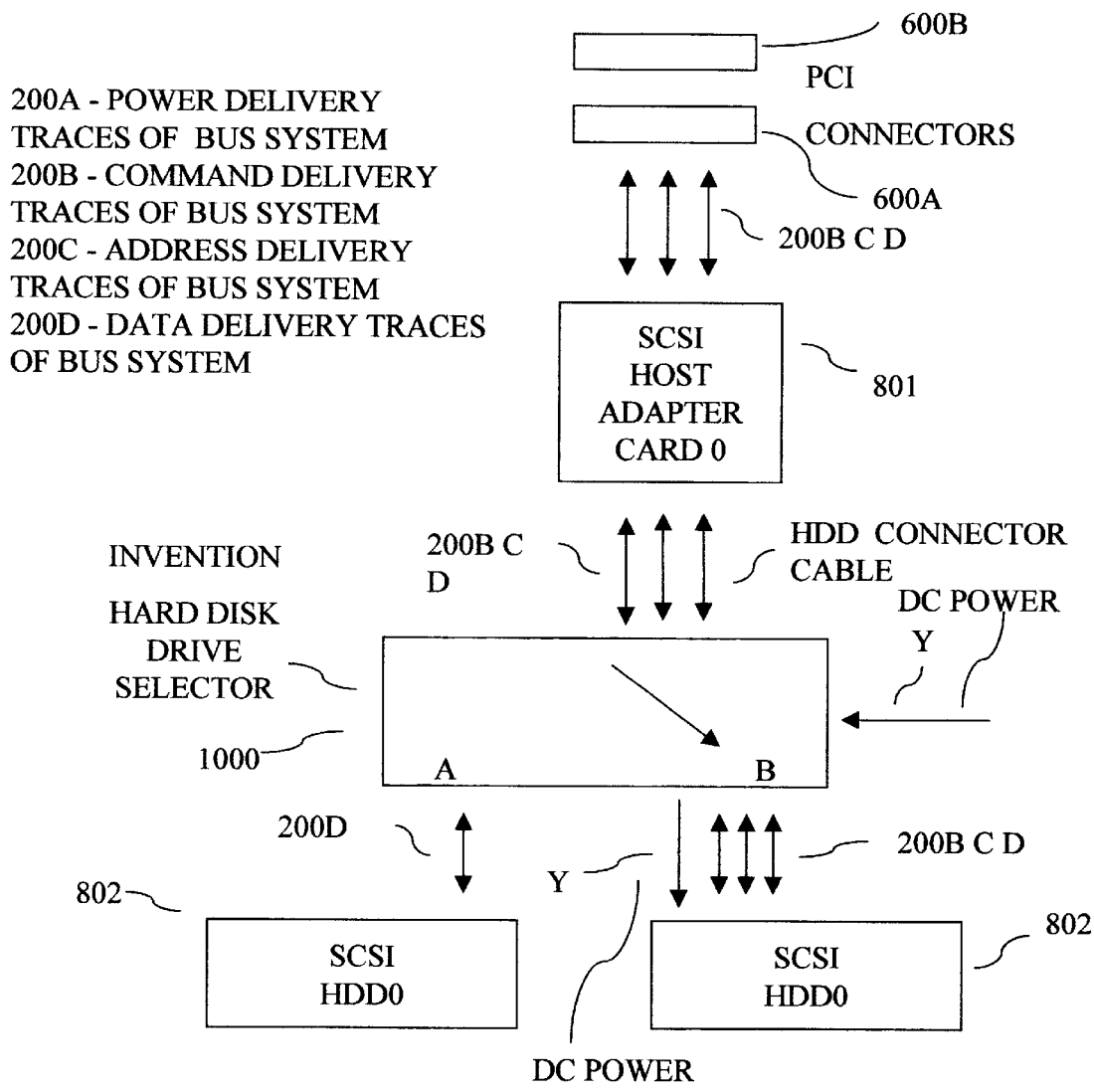
FIGURE 16: NEW ART; SCSI HDD BUS SCHEME WITH INVENTION PLACED IN AN ADD-IN SCSI CONTROLLER ARCHITECTURE

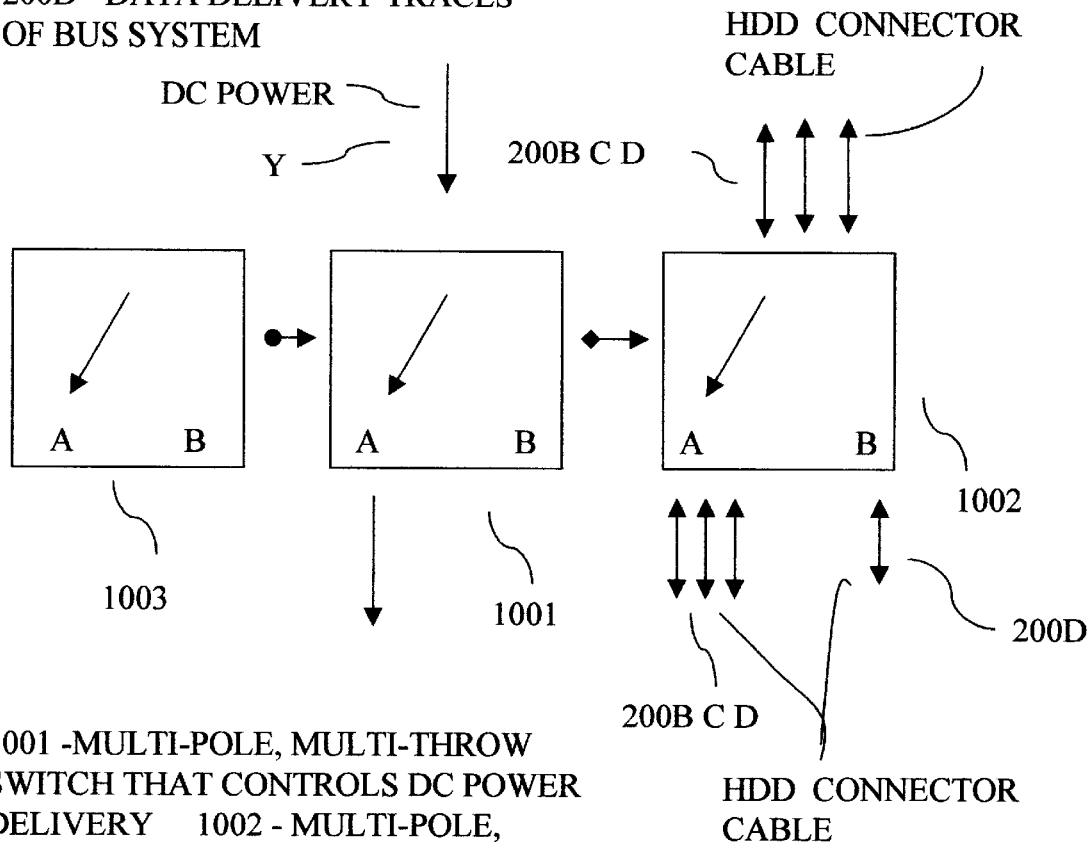
FIGURE 17: NEW ART; THIS INVENTION

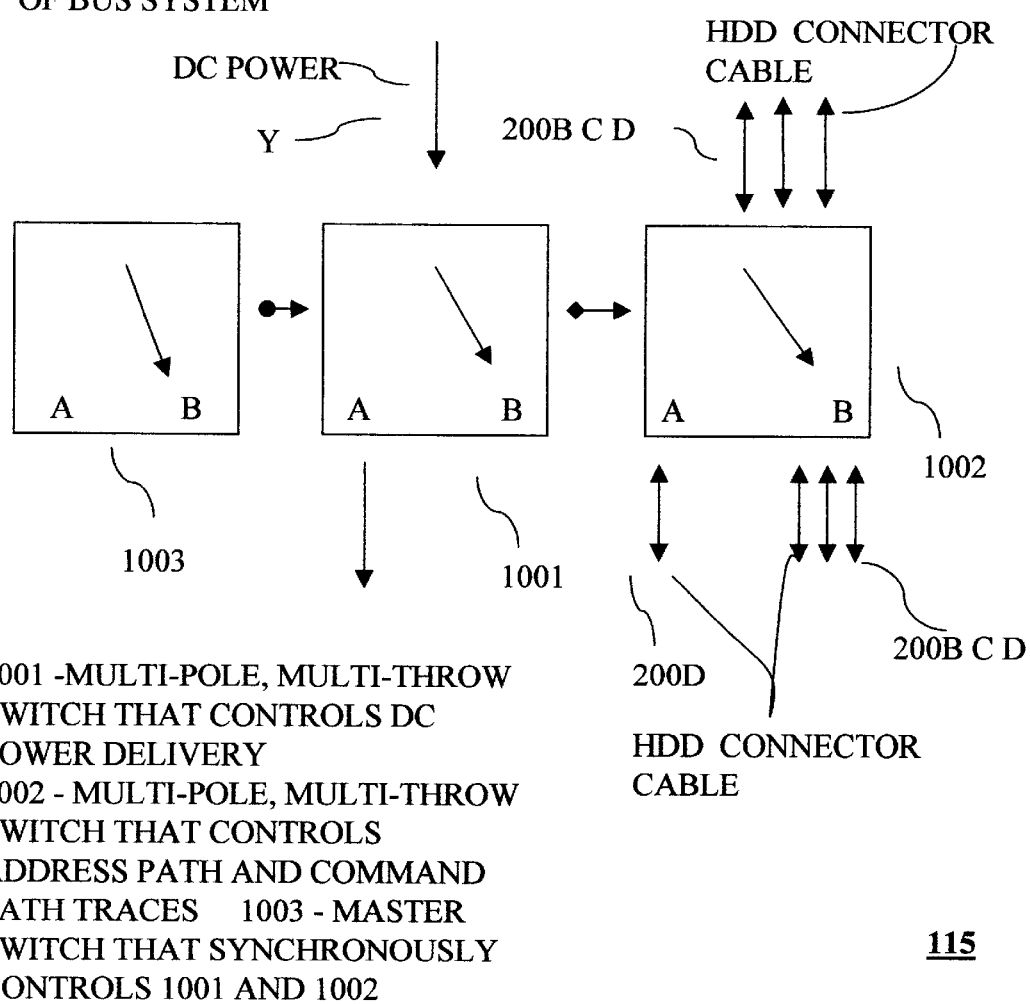
FIGURE 18: NEW ART; THIS INVENTION

HARD DISK DRIVE SELECTOR

Provisional Application No. 60/155,548 filed on Sep. 24, 1999.

BACKGROUND OF THE INVENTION

1. Field of the Invention

The present invention relates generally to a hard disk drive selector mechanism that permits the easy and rapid replacement of one hard disk drive that occupies a unique logical position in a computer system with another hard disk drive. The replacement occurs while the computer system is off. The replacement occurs without removal of either hard disk drive.

2. Description of the Related Art

A modern computer is an electrically powered machine that inputs, processes, and outputs data. It consists of a central processing unit or CPU, main memory, and a real time clock. To make the computer a useful device, many peripheral components are connected to it. These peripheral components include input devices such as keyboards and mice, display devices such as video monitors and printers, and storage devices such as hard disk drives. A computer and all equipment attached to it are hardware. Collectively, these components are known as a computer system.

A computer and its peripheral components input, process, and output data by following sets of instructions stored in memory. The instructions that the computer system follow are software. A set of instructions that accomplish a specific task is called a program. Three types of programs exist; input and output systems, operating systems and applications.

There are two types or levels of input and output systems. The first is the basic input and output system or BIOS. It is a program consisting of the essential instructions that permit a computer's components to interact with each other and with some attached peripheral components. The second is peripheral component input and output systems. These programs allow the computer to communicate with any peripheral device whose input and output system was not part of the BIOS.

An operating system is a program that provides the interface between a computer user, a computer system, and a computer system's other programs, the input and output systems and applications. In this role, an operating system executes and manages all running programs, manages all data being processed by the various running application programs, and controls the use and order of use of all computer hardware. The operating system also can provide system security by being set to restrict access to itself, to applications, and to data.

An application is a program that performs a specific task such as accounting, word processing, or chess playing.

The components of a computer system communicate with each other over the computer system's bus. A bus is a common pathway between multiple devices. A computer system's bus is composed of five groups of electrical conductors. The first group carries electrical current and is a power source for some components connected to the bus. (Other components receive their power directly from the computer system's direct current power supply or from some external source such as typical 110-volt alternating current outlets). The second group of conductors carries data between components connected to the bus. The third group carries addressing information. The fourth group of conductors carries commands and command acknowledgements from one component to another. The fifth portion of the bus is the conductor that connects the real time clock to appropriate system components.

Several devices physically support the bus of a computer system. The first is the computer's motherboard. The motherboard is the main, printed electronic circuit board of a computer system. The second is a daughterboard. A daughterboard is a secondary, printed circuit board that can be added to and removed from the motherboard; it is an expansion board. The third is cabling. Keyboard, mouse, and hard disk drive connecting cables are examples. (Though some devices have become connected to the computer system bus by infrared connection, they are not a consideration in this invention).

The primary computer bus or primary computer bus segment is the portion of the bus that the central processing unit is attached to. All other segments of the bus are thought of as peripheral buses. The order of buses is logically arranged so that higher speed buses are physically closer to the central processing unit while slower buses are farther away. These peripheral buses are actually peripheral devices.

FIGS. 1, 2, 3, 4, and 5 show the bus system from the central processing unit to various internal hard disk drives in a personal computer system.

FIG. 1, entitled Simplified Computer Bus, and tagged as 100, is a simplified block diagram of a typical personal computer system bits. The complete, hardwired bus system is shown and represented by the large block arrow labeled System Bus, and tagged as 200, and by the interconnecting arrow system joining all of the depicted ports or components.

The following hardware components are shown in FIG. 1:
1) the CPU, 401, or Central Processing Unit;
2) the main memory, 403, and cache memory, 402; volatile random access type memory;
3) the clock generator, 404, or CPU clock, used to synchronize communications between computer devices;
4) the BIOS, 405, typically a flash, read-only memory chip used to store the basic input and output software used by the computer at start-up;
and 5) the CMOS, 406, a battery powered/backed-up complementary metal oxide semiconductor chip used to store system configuration information.

Ports are points of connection to the bus for peripheral components. The following ports are shown:
1) a keyboard port, 212;
2) a mouse port, 210;
3) a floppy drive connector, 208;
4) a parallel port, 206;
5) two USB or universal serial bus ports, 214a and 214b;
and 6) two serial ports 202a and 202b.

Host adapters or device controllers are the points of interface between all peripheral devices and the rest of the computer system. Host adapters also hold the memory chips that provide the computer system with the input and output systems specific for many peripheral devices. The following removable host adapters are shown:
1) a sound adapter, 601, a device to which microphones, speakers, radio receivers, etc., are connected in order to use the audio capabilities of a computer;
2) a network adapter, 603, a device that allows the computer to connect to computer networks;

3) a 1394 adapter, 605, also known as Firewire, a high speed serial bus, 4) a video adapter, 501, a device that permits the connection of a video display monitor;

5) two ATA/IDE host adapters 0 and 1, 701 and 703, devices that permit the connection of ATA/IDE compliant devices (the terms ATA and IDE will be defined immediately below);

and 6) a SCSI host adapter, 801 (the term SCSI will be defined immediately below).

Connected to ATA/IDE Host Adapter 0, 701, is ATA/IDE HDD0, 702, or ATA/IDE hard disk drive, 0. Connected to SCSI Host Adapter, 801, is SCSI HDD0, 802, or SCSI hard disk drive 0.

ATA stands for Advanced Technology Attachment. ATA is also the use specification for this type of drive. IDE stands for Integrated Device Electronics. IDE devices are those devices that use the ATA specifications. The terms ATA and IDE are often used as synonyms. SCSI stands for Small Computer System Interface and is a type of device and a use specification.

FIG. 1 also shows an External Power Source, 901. This is something such as standard household electric current (110-Volt alternating current, or AC). This power source provides power to the computer's Power Supply, 301, an alternating current to direct current converter and voltage divider, and to some peripheral components such as a scanner (not shown). Power is delivered from the external power source, 901, to the power supply, 301, by conductor Z.

Some computer hardware components receive electrical power by way of the bus. Conductors X deliver direct current, or DC, electrical power from the Power Supply, 301, to the bus, 200. Some computer hardware, such as hard disk drives, receives direct current electrical power directly from the Power Supply. Conductors Y delivers this power.

FIG. 2, entitled Detailed Computer Bus, and tagged as 101, details a representative hierarchy of the bus system. In this diagram, the portion of the bus that is supported by the system's motherboard is shown.

The following elements of a computer bus and hardwired hardware are shown in this figure:

1) The elements of the bus system;
   a) Local or Processor Bus, 201, the portion of the bus that the CPU is connected to.
   b) PCI or Peripheral Components Interconnect Bus, 205, a high speed peripheral bus system.
   c) ISA or Industry Standard Architecture Bus, 211, a relatively slow peripheral bus,
   and d) the Power Delivery; 200*a*, Command Delivery, 200*b*, Address Delivery, 200*c*, Data Delivery, 200*d*, and Timing Signal Delivery or Timing, 200*e*, traces of the bus system.

2) The hardware hardwired to the bus:
   a) Clock Generator, 404.
   b) PCI or Peripheral Components Interconnect Controller, 203.
   c) ISA or Industry Standard Architecture Bus Controller, 207.
   d) Secondary ATA/IDE Controller, 209.
   e) ISA Onboard Ports Controller, 211.
   and f) BIOS or Basic Input and Output System Flash Read Only Memory Chip, 405.

3) The connectors or slots through which hardware that is not hardwired connect to the bus;
   a) The CPU or Central Processor Unit connection, 401*a*.
   b) Main Memory Connectors, 403*a*, 403*b*, and 403*c*.
   c) AGP or Accelerated Graphics Port, 500.
   d) USB or uniform Serial Bus Connectors, 214*a* and 214*b*.
   e) ATA/IDE Connectors, 700*a*, 700*b*, 701*a*, and 701*b*.
   f) PCI Connectors, 600*a*, 600*b*, 600*c*, 600*d*, and 600*e*.
   g) ISA connector, 600*f*.
   and h) keyboard, 212, mouse, 210, floppy drive, 208, parallel, 206, and serial ports, 202*a* and 202*b*, ports.

The most peripheral components are attached to the computer via the ports shown in FIG. 2

FIG. 3 entitled Prior Art and tagged as 102, shows a typical ATA/IDE hard disk drive, HDD, connection scheme when the ATA/IDE Controller in hardwired to the system bus and motherboard. Included in this diagram are the PCI Bus 205, the ISA Bus Controller 207 the ATA/IDE Connectors 700*a* and 700*b*, the ATA/IDE Hard Disk Drive 702, or ATA/IDE HDD0, DC Power conductor Y, and Power, Command, Address, and Data Delivery Traces 200*a*, 200*b*, 200*c*, and 200*d*.

FIG. 4 also entitled Prior Art and tagged as 103, shows a typical ATA/IDE hard disk drive, connection scheme when the ATA/IDE Controller in not hardwired to the system bus and motherboard. Included in this diagram are the PCI Bus 205, the PCI Connectors 600*a* and 600*b*, the ATA/IDE Host Adapter Card 703, the ATA/IDE Hard Disk Drive 702, or ATA/IDE HDD0, DC Power conductor Y, and the Power, Command, Address, and Data Delivery Traces 200*a*, 200*b*, 200*c*, and 200*d*.

FIG. 5 also entitled Prior Art and tagged as 104, shows a typical SCSI hard disk drive, connection scheme. Included in this diagram are the PCI Bus 205, the PCI Connectors 600*a* and 600*b*, the SCSI Host Adapter Card 801, the SCSI Hard Disk Drive 802, or SCSI HDD0, DC Power conductor Y, and the Power, Command, Address, and Data Delivery Traces 200*a*, 200*b*, 200*c*, and 200*d*.

FIGS. 3, 4, and 5, show that elements 200*b*, 200*c*, and 200*d*, the command, address, and data traces, are incorporated into the hard disk drive connector cable. Element 200*a* is not included in the hard disk drive connector cable. Hard disk drives in these schemes receive their DC power directly from the computer system's Power Supply by conductor Y.

The hard disk drive, abbreviated HDD, is integral to the personal computer's convenient operation. The hard disk drive is a peripheral, mass storage device that is rapidly accessible by the computer. It is used as a place in which to store and from which to retrieve data. It is also used as a place in which to store and from which to execute operating systems and application software.

The hard disk drive is composed of several elements. The first is the actual storage medium. This medium is usually a series of aluminum or glass platters coated with a ferromagnetic material upon which electromagnetic signals are stored. The second is the drive mechanism. This mechanism spins the platters. The third is the read and write heads. These elements read signals from or write signals to the storage medium. The fourth is the controller board. This component mediates the reading and writing of signals to and from the hard disk drive and rest of the computer system.

Hard disk drives may be connected to a computer system at many points. These points include parallel ports, uniform serial bus ports, FireWire or High Performance Serial Bus ports, or external SCSI, Small Computer System Interface, ports. The typical hard disk drive connection in a personal computer system, though, is by means of an internal port or connector; a port that can only be accessed after opening the case of the computer system. Hard disk drives utilizing these internal connections are usually mounted permanently inside the system's case. These internal HDD(s) are the devices of choice for the storage of a computer system's operating system.

Two different types of hard disk drives are found in personal computer systems. The most common is called an ATA or IDE hard disk drive (ATA/IDE). The second type of hard disk drive used in typical personal computer systems is the SCSI hard disk drive.

When a computer system is turned on, built in procedures cause the computer to load the basic input and output system stored on the bios chip, 405, into memory and to begin to inventory, recognize, and test certain attached peripheral devices. This process continues with the computer seeking to identify all remaining attached peripheral components. As these peripheral components are identified, any additional input aid output systems needed are taken from each device's host adapter and loaded into memory. As each peripheral device is loaded, its logical position within the computer system is also entered into memory. The logical position that each component holds is called its address. Each address is exclusive and only one component may occupy an address. (The address that a component occupies might actually be a range of addresses).

Next, an operating system is executed and loaded into memory. As the operating system loads into memory it summarizes the logical position that mass storage devices hold by assigning each device a letter name. In a personal computer system using the Microsoft Corporation's Windows Operating System that has one internal, ATA/IDE HDD connected as shown in either FIG. 3, 102, or FIG. 4, 103, the HDD is assigned the letter C.

The processes that occur from the turning on of the computer system through the complete loading of the operating system are called booting. If Drive C contained the operating system and was automatically able to execute the operating system, Drive C would be the boot drive.

During the booting process, this Drive C, or any other drive present, is recognized as present by the following process. The CPU, central processing unit, sends out a command demanding that the drive respond if present. The command is followed by the address that is reserved for the drive. If the drive responds, then its presence is loaded into memory.

After the computer system is successfully booted the same procedure is used to access the drive. A command such as a write command is sent followed by an address. If the address is the drive's address, the drive obeys the command.

Commands are send via command delivery traces, object 200*b* in Figures. Address information is sent via address delivery traces, object 200*c* in Figures.

If the command delivery traces and the address delivery traces are interrupted during both booting and operation of the computer system the drive does not occupy a logical position in the computer system.

FIG. 6, entitled Typical ATA/IDE Bus Trace Assignments, and FIG. 7, entitled Typical Internal 50 Pin SCSI Bus Trace Assignments, detail which ATA/IDE and SCSI bus traces carry commands and addresses.

Presently, there are two methods in which different physical hard disk drives can occupy one logical position in a computer system. (The different drives would, of course, occupy the logical position singularly. That is, one disk drive would occupy the logical position during one booting and operation of the computer system, during one session. Another hard disk drive would occupy the logical position during another session).

The first method entails disconnecting the hard disk drive connecting cable from one hard disk drive and then connecting the cable to another hard disk drive while the computer is turned off The process might also entail the moving of the hard disk drive power cable, object Y in all Figures, from one drive to another.

The second method utilizes a bay and drawer docking mechanism. Such a device is disclosed in U.S. Pat. No. 5,694,290, issued Dec. 7, 1997, to Chang. This patent is for a Replaceable Hard Disk Drive Box Structure. The type of device consists of a bay adapter, a removable hard disk drive carrier or drawer, and a set of matching male and female plugs. The male plug is mounted on the inside of the bay adapter. The female plug is mounted on the outside of the drawer. The plugs are arranged so that they mate when the drawer is properly and fully inserted into the bay adapter. The female plug on the drawer connects to either a short ATA/IDE or a short SCSI hard disk drive cable and a hard disk drive power cable that are inside of the drawer. A hard disk drive is mounted inside the drawer and is connected to the hard disk drive connecting cable and power cable of the drawer. The bay adapter is mounted in a computer system's case in a bay that has an opening outside the case. The male plug of the bay adapter is connected to either the ATA/IDE or SCSI hard disk drive connecting cable and the hard disk drive power cable inside the computer system's case. The hard disk drive connecting cable inside the case is connected to a hard disk drive interface. The hard disk drive power cable inside the case comes from the computer system's power supply. Assuming that the connections are to the port and adapter that would assign a permanently mounted hard disk drive the logical position of Drive C as discussed before, any hard disk drive connected to the computer system by this method would be Drive C. In the case of logical Drive C, the drawer and its drive would have to be inserted fully into the bay while die computer was turned off and left in place for the entire session to have the computer system function correctly. By having five drawers, each with its own hard disk drive, the computer system's user could readily change the physical drive occupying the logical drive position to any of four other physical hard disk drives between computer use sessions by changing drawers.

FIG. 8, entitled Present Art and tagged 105, FIG. 9, entitled Present Art and tagged as 106, and FIG. 10, entitled Present Art and tagged as 107, are copies of FIGS. 2, 3, and 4, Prior Art Diagrams. In FIGS. 8, 9, and 10, however, ATA/IDE hard disk drives 702 and SCSI Hard Disk Drive 802 are not shown. In these Figures the hard disk drives are housed in drawers as disclosed in Chang's invention. These drawers are tagged as 2001 as all drawers are identical and interchangeable. Also in FIGS. 8, 9, and 10, is a bay adapter such the one in Chang's invention. It is tagged as 2000.

The first method of exchanging different physical hard disk drives in one logical hard disk drive location is obviously not a method to be considered if such exchanges need to made frequently. The second method is a much more practical. However, the second method has several serious drawbacks. The most serious drawback is the physical safety of hard disk drives in the removable drawers. These devices are easily dropped or banged against something while being handled. Such an event can permanently destroy the storage device, the hard disk drive.

Though Chang's invention and method of exchanging hard disk drives has its mentioned drawbacks, Chang's invention offers unprecedented security for the software stored on a hard disk drive. If a hard disk drive is removed from its logical position in a computer system, the software on the hard disk drive can not be accessed, altered, or otherwise misused.

Already developed devices are now discussed.

U.S. Pat. No. 3,986,169, issued to Kobayashi et al., discloses a device that allows transferring of data between two computer systems and their data storage devices and makes provisions for the device to identify data sources and destinations. If the data source or destination is not properly identified to the device, the data transfer is inhibited. Kobayashi's invention is an active mediator in the data path.

U.S. Pat. No. 4,176,341, issued to Miyazaki, discloses a device that permits time-sharing of a data path by multiple Input/Output devices.

U.S. Pat. No. 5,574,929, issued to Pieterse et al., discloses a device that permits computer systems that utilize two central processor units to synchronously function and access both random access computer memory and peripheral computer devices, including hard disk drives, in a coordinated manner. This device is an active mediator in the data path.

U.S. Pat. No. 5,630,171, issued to Chejlava, Jr., et al., discloses a device that translates DMA mode data transfers to PIO Mode transfers or to I/O Mode transfers in order to enhance the efficiency of the transfers to and from data storage devices. This devise is an active mediator in the data path.

U.S. Pat. No. 5,761,460, issued to Santos et al., discloses a device that is a dual-master storage device interface that is temporary and which reconfigures both the resident computer system hard disk drive and an auxiliary, nonresident hard disk drive. The device automatically directs and redirects the data path and permits the use of temporarily attached hard disk drives.

U.S. Pat. No. 6,272,533, issued to Browne, discloses a device that permits a hard disk drive to remain in its logical position within a computer system while it prevents writing to the hard disk drive.

SUMMARY OF THE PRESENT INVENTION

This application for patent of an invention discloses a new and novel method and technique that permits the rapid and easy replacement of one physical hard disk drive by another physical hard disk drive in a single, logical hard disk drive position in a computer system. The method and invention allows the exchange to be made without the physical removal and replacement of hard disk drives and is accomplished by multiple pole, multiple throw switching devices. This method eliminates the dangers to the hard disk drives being exchanged that exist in all other present methods. This method makes such exchanges easy, rapid, and safe. Finally, this method preserves the unprecedented security that software is given when the hard disk drive that holds the software is removed from a computer system.

BRIEF DESCRIPTIONS OF THE DRAWINGS

All of the drawings are in related sets. The first related set consists of drawings 1 through and, including, 7. This set depicts the typical personal computer system sold to a customer in any store. More exactly, it depicts the bus of such a computer system.

FIG. 1. Simplified Computer Bus. This block diagram shows the general relationship between the computer system bus and the system's components.

FIG. 2. Detailed Computer Bus. This block diagram shows a more specific relationship between the computer system bus and the system's components.

FIG. 3. Prior Art. This block diagram shows the specific relationship between the computer system bus and an ATA/IDE hard disk drive when the hard disk drive host adapter, within the ISA Bus Controller, 207, is hardwired to the system bus and motherboard.

FIG. 4. Prior Art. This block diagram shows the specific relationship between the computer system bus and an ATA/IDE hard disk drive when the hard disk drive host adapter is not hardwired to the system bus and motherboard. Instead, the host adapter is added to the computer system by insertion into a PCI Slot.

FIG. 5. Prior Art. This block diagram shows the specific relationship between the computer system bus and an SCSI hard disk drive when the hard disk drive host adapter not is hardwired to the system bus and motherboard. Instead, the host adapter is added to the computer system by insertion into a PCI Slot.

FIG. 6. Typical ATA/IDE Bus Trace Assignment. This is a table showing the typical function of each trace within an ATA/IDE hard disk drive connecting cable.

FIG. 7. Typical 50 Pin SCSI Bus Trace Assignment. This is a table showing the typical function of each trace within an SCSI hard disk drive connecting cable.

The second set of related drawings consists of drawing FIGS. 8, 9, and 10. These are representations of FIGS. 3, 4, and 5. In these drawings, though, the hard disk drives are housed within devices similar to those disclosed in Chang's invention discussed in the Background to the Invention section of this application.

FIG. 8. Present Art. Interchangeable ATA/IDE hard disk drive scheme for ATA/IDE host adapter that is hardwired to the system bus and motherboard using a Chang type device and showing supplementary drawers.

FIG. 9. Present Art. Interchangeable ATA/IDE hard disk drive scheme for ATA/IDE host adapter that is not hardwired to the system bus and motherboard using a Chang type device and showing supplementary drawers. Instead, the host adapter is added to the computer system by insertion into a PCI Slot.

FIG. 10. Present Art. Interchangeable SCSI hard disk drive scheme for SCSI host adapter that is not hardwired to the system bus and motherboard using a Chang type device and showing supplementary drawers. Instead, the host adapter is added to the computer system by insertion into a PCI Slot.

The third set of related drawings is FIGS. 11, 12, 13, 14, 15, and 16. These, also, are re-presentations of FIGS. 3, 4, and 5. In these drawings, though, this invention, The Hard Disk Drive Selector, 1000, is included. The hard disk drives shown, are represented as being the same logical drives not as different physical drives.

FIGS. 11 and 12. New Art. This pair of drawings shows the ATA/IDE scheme when the host adapter is hardwired to the system bus and motherboard. FIG. 11 shows this invention, The Hard Disk Drive Selector, 100, selecting one hard disk drive while FIG. 12 shows this invention selecting another hard disk drive. Both figures show both hard disk drives.

FIGS. 13 and 14. New Art. This pair of drawings shows the ATA/IDE scheme when the host adapter is not hardwired to the system bus and motherboard. Instead, the host adapter is added to the computer system by insertion into a PCI Slot. FIG. 13 shows this invention, The Hard Disk Drive Selector, 100, selecting one hard disk drive while FIG. 14 shows this invention selecting another hard disk drive. Both figures show both hard disk drives.

FIGS. 15 and 16. New Art. This pair of drawings shows the SCSI scheme when the host adapter is not hardwired to the system bus and motherboard. Instead, the host adapter is added to the computer system by insertion into a PCI Slot. FIG. 15 shows this invention, The Hard Disk Drive Selector, 100, selecting one hard disk drive while FIG. 16 shows this invention selecting another hard disk drive. Both figures show both hard disk drives.

The final pair of drawings, FIGS. 17 and 18, show block diagram depictions of the three components on this invention.

FIGS. 17 and 18. This pair of drawings shows the invention as being composed of three components: a DC power control component; an address and command trace control component; and a master control component.

DETAILED DESCRIPTION OF THE PREFERRED EMBODIMENT OF THE INVENTION

This invention is a device that controls the selection of one physical hard disk drive (HDD) to occupy a single logical hard disk drive position in a personal computer system. The choice is made from two, three, four, etc., physical hard disk drives available to be selected. The choice made may actually be for a pair of hard disk drives operating as a unit as master and slave ATA/IDE hard disk drives can. For simplicity, though, all explanations will be made using a single hard disk drive.

The present invention has three component parts. The first component part is a switching device that resides within the direct current power supply circuits, FIG. 1, element Y, that transmit direct current electrical energy from the computer system's power supply, FIG. 1, element 301, directly to a hard disk drive, FIG. 1, element 702 and element 802. This first component part, the power control component, has the function to open or close the circuits of this segment of the computer system's bus. The second component is a switching device that resides within the computer system's bus between the hard disk drive host adapter, FIG. 1, element 207, FIG. 13, element 703, or FIG. 15, element 801, and the hard disk drive, FIG. 11, element 702, FIG. 13, element 702, or FIG. 15, element 801. This second component, the command/address control component, has the function to open or close the addressing, FIG. 2, element 200c, and command/control, FIG. 2, element 200b, circuits of these segments of the computer system's bus. The third component part is the master control component; it controls the first two components' function; and, this component is readily accessed from outside the computer system's case by the computer operator. These three elements operate only as a single unit; they operate synchronously. For the selected hard disk drive, the power, command, and address circuits are closed by this invention. These same circuits to any other hard disk drive, the hard disk drive(s) not selected, are opened by this invention.

The present invention is depicted in FIGS. 17 and 18 in a block diagram that shows the three elements individually. In these two figures, the power control component is tagged as element 1001, and the command/address component is tagged as 1002. The master control element is tagged as element 1003.

The present invention is also depicted in FIGS. 11, 12, 13, 14, 15, and 16. In these figures, the invention is depicted, for clarity, as a single element and tagged as 1000.

In FIGS. 11 through and including 18, two settings are depicted for each use of this invention; setting A or setting B. When the master control component is set to setting A, as is shown in FIGS. 11, 13, 15 and 17, the hard disk drive connected to this invention at setting A is connected. That is, the direct current power supply traces, depicted as Y in these Figures and the command delivery traces, depicted as 200b, and the address delivery traces, depicted as 200c, are closed to the hard disk drive through setting A but are open to the hard disk drive at setting B. When the master control component is set to setting B, as is shown in FIGS. 12, 14, 16 and 18, the hard disk drive connected to this invention through setting B is connected. That is, the direct current power supply traces, depicted as Y in these Figures and the command delivery traces, depicted as 200b, and the address delivery traces, depicted as 200c, are closed to the hard disk drive at setting B but are open to the hard disk drive at setting A.

The construction of the three components of this invention, the power control component, the command/address control component, and the master control component, may be accomplished by the use of mechanical switching elements, electromechanical switching elements, or by electronic switching elements. The construction may accommodate the selection of one of one, two three, four, or more hard disk drives to occupy a single logical hard disk drive position within a personal computer system. The construction may also permit the selection of no hard disk drive to occupy a single logical hard disk drive position within a personal computer system.

Each component part of this invention is essentially a multi-pole, multi-throw switch that synchronously opens or closes all circuits of elements Y, 200b, and 200c connected to a particular hard disk drive as shown in FIGS. 11 through and including 16.

Element Y in these Figures consists of four wires, two ground leads, one +12 volt DC lead, and one +5 volt DC lead. The power control component, element 1001, operates by opening and closing the +12 volt and the +5 volt DC leads.

Elements 200b and 200c in FIGS. 11, 12, 13, and 14, consist of fifteen wires. These wire assignments are shown in FIG. 6 and are the ATA/IDE Bus Trace Assignments for addressing and command communications between the ATA/IDE hard disk drive and the rest of the computer system. They are, from FIG. 6, Pin Assignments, 21, 23, 25, 27, 28, 29, 31, 32, 33, 34, 35, 36, 37, 38, and 39. In an ATA/IDE hard disk drive scheme, the command/address component, element 1002, operates by opening and closing these traces.

Elements 200b and 200c in FIGS. 15 and 16 consist of eighteen paired wires. These wire assignments are shown in FIG. 7 and are the Typical Internal Fifty Pin SCSI Bus Trace Assignments for addressing and command communications between the SCSI hard disk drive and the rest of the computer system. They are, from FIG. 7, Pin assignments 29 and 30 and 33 through and including 48. In an internal SCSI hard disk drive scheme, the command and address component, element 1002, operates by opening and closing one half of these traces; by opening and closing traces 29, 33, 35, 37, 39, 41, 43, 45, and 47.

Any hard disk drive whose position in a computer system is controlled by this invention and that is not the selected hard disk drive during a particular computer use session has its software completely protected for reading and writing; from all alteration.

The master control components function may be controlled by a keyed switch that uses a removable key. This would offer increased security.

I claim:

1. A hard disk drive selector, mounted permanently in a single computer system for coupling one of plurality of hard disk drives to the hard disk drive selector, prior to booting the computer system to occupy a single, logical hard disk drive position during a single computer system use session, comprising:

Three component parts, a master control component, a power control component and a command/address control component; wherein the components are multi-pole, multi-throw switching elements with predetermined numbers of poles to switch all circuits in each bus segment of the computer system they are used in and with predetermined number of throws to control the selection of the desired hard disk drive attached to the hard disk drive selector; the components are configurable;

a) the master control component is accessible from the outside of the computer system's case by the user and synchronously controls the operation of the power control and the command/address control components by causing these components to close their circuits to an user selected hard disk drive to place the hard disk drive in an operational mode and open their circuits to any non-selected disk drives from the hard disk drives connected to the hard disk drive selector to place the non-selected disk drives in a non-operational mode; wherein the master control component is operated by a switch that has a removable key as a security feature;

b) the power control component is coupled between the computer system's electrical supply bus and the power supply terminal of each of the plurality of the hard disk drives; and close the circuit from the computer system's power supply to the user selected hard disk drive and open the circuit to any not-selected disk drives from the hard disk drives connected to the hard disk drive selector;

c) the command/address control component within a computer system bus is coupled between a hard disk drive host adapter and plurality of the hard disk drives to close the command carrying and address carrying circuits from the hard disk drive host adapter to the user selected hard disk drive and to open the command carrying and address carrying circuits from the hard disk drive host adapter to not-selected hard disk drives connected to the hard disk drive selector.

* * * * *